July 19, 1932. T. G. JUNGERSEN 1,867,844
DUMPING BODY FOR AUTOMOBILE TRUCKS
Filed Feb. 13, 1928 7 Sheets-Sheet 1

July 19, 1932.   T. G. JUNGERSEN   1,867,844
DUMPING BODY FOR AUTOMOBILE TRUCKS
Filed Feb. 13, 1928   7 Sheets-Sheet 4

July 19, 1932. T. G. JUNGERSEN 1,867,844
DUMPING BODY FOR AUTOMOBILE TRUCKS
Filed Feb. 13, 1928 7 Sheets-Sheet 7

Patented July 19, 1932

1,867,844

UNITED STATES PATENT OFFICE

THÓGER GRÓNBORG JUNGERSEN, OF LYNGVY, NEAR COPENHAGEN, DENMARK

DUMPING BODY FOR AUTOMOBILE TRUCKS

Application filed February 13, 1928. Serial No. 254,046.

This invention relates to improvements in dumping bodies for automobile trucks and the like and its purpose is to provide an improved body and associated parts whereby the body may be conveniently and readily tilted for the purpose of dumping the contents of the truck. The principal object of the invention is to provide an improved dumping mechanism for permitting the tilting of the body in either direction laterally of the truck. A further important object of the invention is to provide improved means for effecting the movement of the body in a substantially horizontal path of travel until it reaches the dumping position. A further object is to provide a dumping body mounted so that its center of gravity when loaded moves downwardly when moving from horizontal position to dumping position while at the same time causing the center of gravity of the unloaded body to be higher in its tilted dumping position than it is in its normal horizontal position, thus facilitating the movement of the body in both directions. Still another object is to provide improved mechanism for predetermining the direction in which the body will be dumped and for preventing the accidental dumping thereof in the reverse direction. A further object is to provide improved means for locking the body in its normal horizontal position. Another object of the invention is to provide improved means whereby the dumping doors are automatically released during the dumping movement of the body. Another feature of the invention is the provision of improved means for supporting the body directly on the guiding means which control the dumping movements of the body. Other objects relate to various features of construction and arrangement which will appear more fully hereinafter.

The nature of the invention will be understood from the following specification taken with the accompanying drawings in which one embodiment is illustrated. In the drawings.

The invention is shown as being embodied in an automobile truck 10 having wheels 11, a rear axle 12, front fenders 13 and a cab 14 which is occupied by the driver. The truck also carries a body 15 having a truck floor 16, a front end wall 17, a rear end wall 18 and two side walls or dumping doors 19. The body 15 is adapted to move horizontally and laterally into the tilted position shown in Fig. 1 for the purpose of dumping its contents and when in its dumping position the door 19 is automatically lowered to permit the contents to slide thereover. The body 15 may be tilted laterally in either direction and the features of the present invention may also be employed in connection with a rearwardly dumping body.

The wheels and axles of the truck support a truck frame comprising a pair of longitudinal side frame members 20 of channel form which are connected by front and rear transverse frame members 21. The frame members 20 are united to the frame members 21 by means of angle plates 22 and rivets 23, thus forming a rigid rectangular frame construction on which are mounted the inclined roller guides or channel members 25 arranged in the manner illustrated particularly in Figs. 6 and 7. The channel members 25 are arranged in pairs at the front and rear ends of the truck frame and are secured to the truck frame in such a manner that those of each pair converge upwardly and meet in the plane of the longitudinal center line of the truck. Each channel member 25 is arranged with its web in a vertical plane and the flanges of the rear pair of channel members are directed rearwardly while those of the front pair are directed forwardly. The lower flanges 25$^a$ form track members for the body supporting rollers hereinafter described and these lower flanges 25$^a$ of each pair are connected at their upper meeting ends by means of a bracket 26 which is secured thereto by rivets 27 and which carries an upwardly extending arm 26$^a$ having formed thereon a horizontally extending hanger pin 28 adapted to limit the movement of the body in either direction and to support the body in its extreme dumping position.

Figures 6, 7:
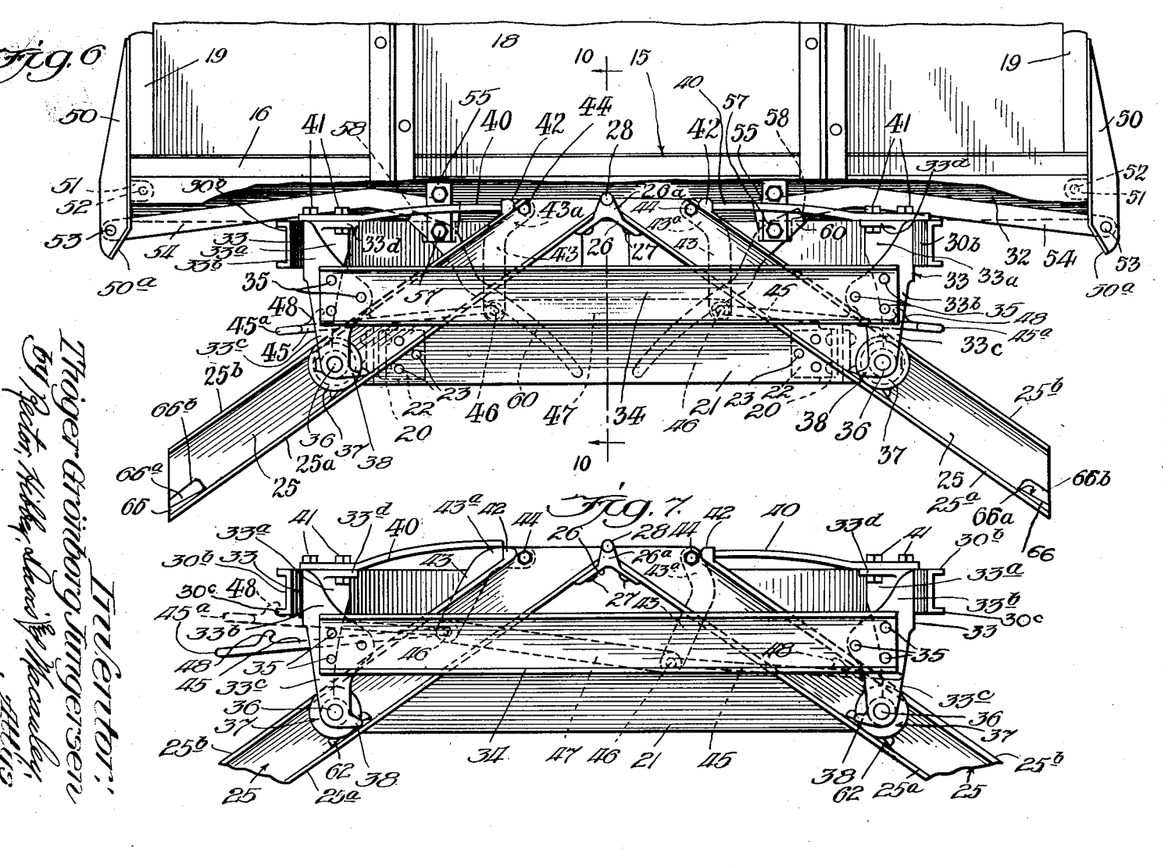
Fig. 6 shows a rear end view of the dumping body and associated parts in their normal positions.
Fig. 7 is a view similar to that of Fig. 6, with the body removed, showing the positions of the parts after one of the latch members has been released to permit the movement of the body toward the right as viewed in Fig. 6.
Figure 9:
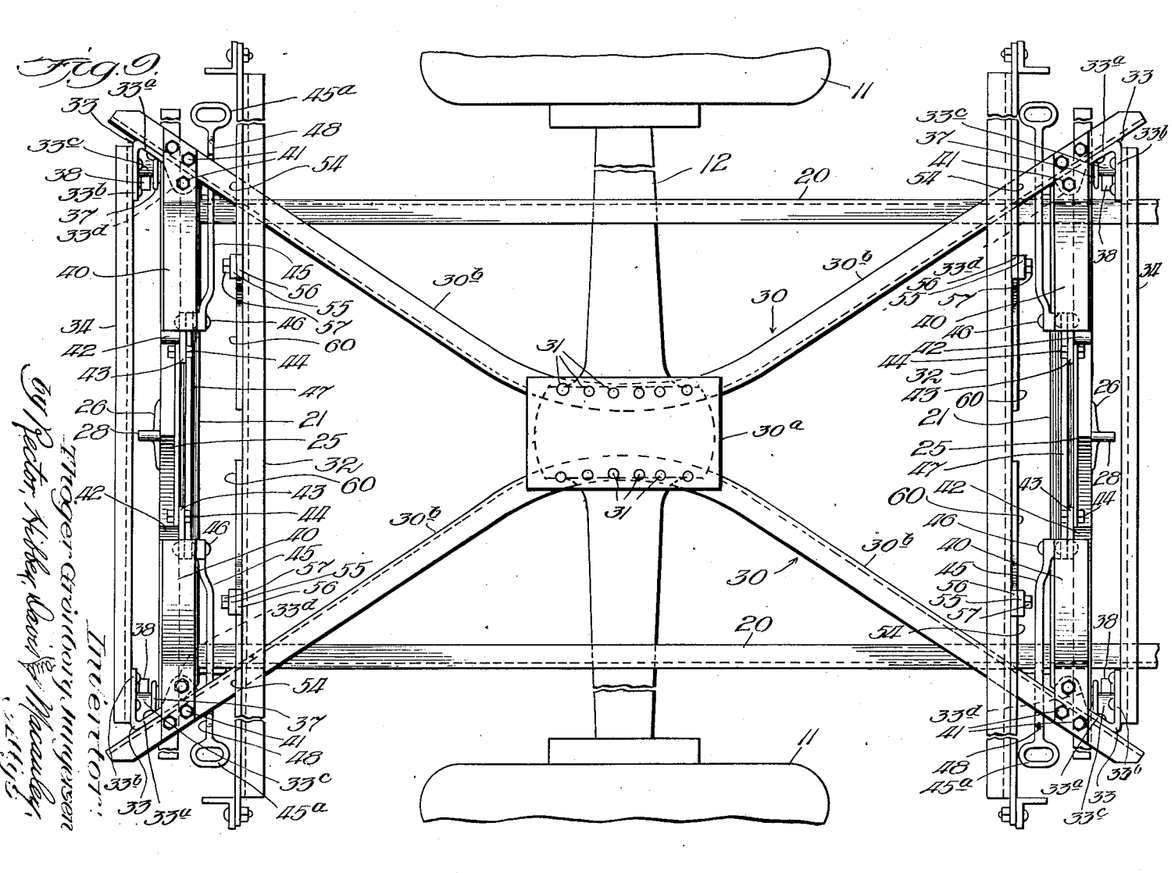
Fig. 9 shows a top plan view of the body under frame and truck frame, the body being removed.
Figure 10:
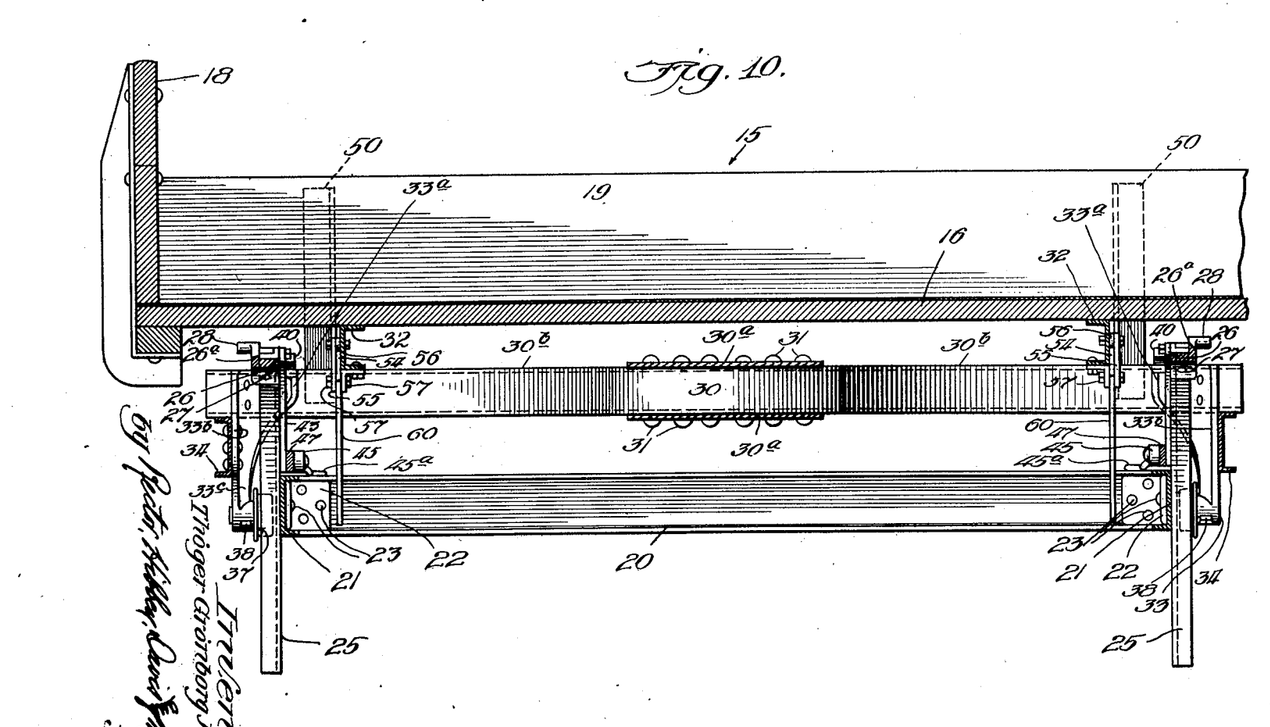
Fig. 10 shows a longitudinal section taken on the line 10—10 of Fig. 6.

The body 15 is mounted directly on an under frame comprising a pair of frame members 30 of angle cross-section which are arranged in the manner shown particular in Fig. 9 where each member 30 is shown as comprising a relatively short curved central portion connecting two outwardly diverging parts 30$^b$. The flanges of the central curved parts of the two frame members 30 lie adjacent each other and are secured rigidly together by rivets 31 and the plate 30$^a$ so that the two frame members 30, when secured together, form an X-shaped frame to which the transverse body frame members 32, on the under side of the body 15, are directly secured. The ends of the arms 30$^b$ of the frame members 30 are each secured to the upper end of a roller bracket 33 each comprising a flange 33$^a$ which lies in contact with the web of the member 30$^b$ and also a flange or plate 33$^b$ which is directed transversely of the body and to which there is attached one end of one of the transverse frame members 34 by means of rivets 35. The frame members 34 are of channel form with their flanges directed forwardly and rearwardly at the front and rear ends of the body, respectively, and they are attached to the brackets 33 below the plane of the members 30, as shown in Fig. 6. The brackets 33 also have parts 33$^c$ which project below the transverse frame members 34 in planes extending transversely of the body and these projections 33$^c$ have mounted therein the axles 36 on which the supporting rollers 37 are rotatably mounted. The downward extensions 33$^c$ of the brackets 33 are located in proximity to the channel members or roller guides 25 and the rollers 37 engage these roller guides and travel on the lower flanges 25$^a$ thereof. In this way, the body can be moved laterally in either direction by causing the rollers at one side of the body to move upwardly in their roller guides 25 while the opposite rollers 37 move downwardly in their roller guides. The extent of this lateral dumping movement of the body is limited by the engagement of hook members 38, formed on the lower extensions 33$^c$ of the roller brackets, with the hanger pins 28 located at the converging ends of the roller guides. The hook members 38 are directed inwardly so that when the rollers 37 on either side of the body reach the upper limits of their travel, these hook members engage the pins 28 and prevent further movement while at the same time retaining the rollers on the lower bracket members 25$^a$ of the guide channels.

The body 15 is normally retained in the horizontal position shown in Fig. 6 by means of latch members 40 which are in the form of leaf springs having their outer ends secured by bolts 41 to the top horizontal flanges 33$^d$ of the roller brackets 33. The latch members 40 are in the form of leaf springs and their inner ends are adapted to engage lugs 42 which are secured to or formed on the upper ends of the upper flanges 25$^b$ of each of the roller guides 25. These leaf springs 40 normally occupy the positions shown in Fig. 6 and thus retain the body 15 against lateral movement in either direction by their engagement with the vertical faces of the lugs 42. When it is desired to release these latch members 40, their inner ends may be elevated by means of levers 43 which are pivotally mounted on bolts 44 secured to the upper ends of the roller guides 25. The levers 43 are of angular form, being directed outwardly and thence downwardly from the bolts 44 and when one of these levers is swung outwardly about its pivot, the part 43ª thereof is adapted to engage the inner end of one of the latch members 40 and elevate it so that its inner end lies above the adjacent lug 42. The lower end of each lever 43 is connected to an operating rod 45 having a handle 45ª at its outer end. These operating rods 45 normally rest upon the longitudinal truck frame members 20 and the pins 46 by which they are pivotally connected with the levers 43 also serve to form pivotal connections with the cross links 47, each of which connnects the two levers 43 at one end of the truck body. This cross-connection of each pair of levers 43 prevents the two levers on opposite sides of the body from being operated at the same time to release the latch members 40 at opposite sides of the body and thereby leave the body free to tilt in either direction. To make this cross-connection effective, and to retain one latch member in released postion, each operating rod 45 is provided with a hook 48 which is adapted to be hooked over the lower flange 30ᶜ of one of the frame members 30, as shown in Fig. 7, after the rod 30 has been moved laterally to release one of the latch members 40. As shown in Fig. 7, the latch member at one side of the body has been released and the lever 43 at the other side of the body has been swung downwardly and retained in that position by the hooking of the lug 48 over the flange 30ᶜ on the body frame member 30. Assuming that the same condition prevails at the other end of the body, the parts are then in readiness for dumping toward the right, as viewed in Fig. 7.

Figure 8:
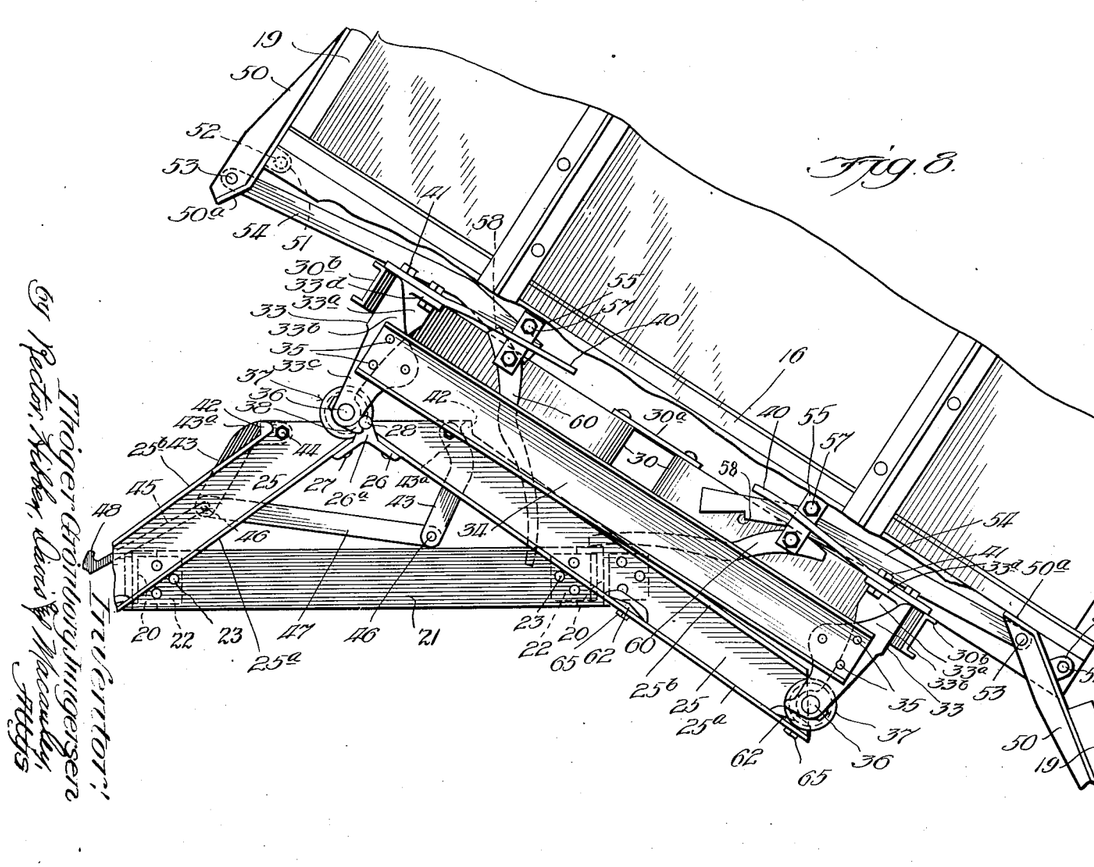
Fig. 8 shows a rear end view of the dumping body and associated parts after the body has been moved toward the right to its dumping position.

As the body moves to its dumping position in either direction, the door 19 on the side of the body toward which the dumping movement takes place, is adapted to be automatically lowered. For this purpose, each door 19 is secured to vertical stays or posts 50 which project downwardly below the floor 16 of the body on the outer side of the door, these stays 50 being provided with inwardly directed brackets 51 which are pivoted at 52 on the ends of the transverse body frame members 32, thus hinging the door so that it can swing outwardly and downwardly and so that the stays or posts 50 will swing beneath the body 15 when the door is in its open position, as shown in Fig. 8, and the inclined end faces 50ª of the posts engage the bottom of the body to hold the upper surface of the door when open at such an angle to the body floor that it will readily pull out of the pile of dumped contents of the body when the body is thereafter restored to its horizontal position. The lower ends of the stays or posts 50 are pivotally connected at 53 with the outer ends of locking bars 54 which extend inwardly from the top flanges of the frame members 30 and alongside of the transverse frame members 32, as shown particularly in Figs. 6 and 9. The inner ends of the bars 54 are retained in proximity to the frame members 32 by means of guide plates 55 which are spaced from the members 32 by blocks 56 and secured to the frame members 32 by bolts 57. The locking bars are provided on their under sides and near their inner ends with notches 58 adapted to be engaged by the upper extremities of the locking levers 60 which are pivoted on the lower ends of the guide plates 55. The locking levers 60 converge downwardly and inwardly from their pivotal points and are of such length that when the body is moved laterally toward a dumping position, the levers 60 at one side of the body will engage the top flange of one of the longitudinal frame members 20 and be thereby actuated to release the upper ends of these levers from engagement with the notches 58 in the locking bars 54 at that side of the body, the body being then in inclined position. The weight of its load pressing against the door 19 at the lower side of the body, will automatically open that door while at the same time the locking bars 54 will slide inwardly within the guide plates 55, as shown in Fig. 8. In this figure, the positions of the body and other parts are illustrated in dumping position.

Figures 2, 3, 4, 5:
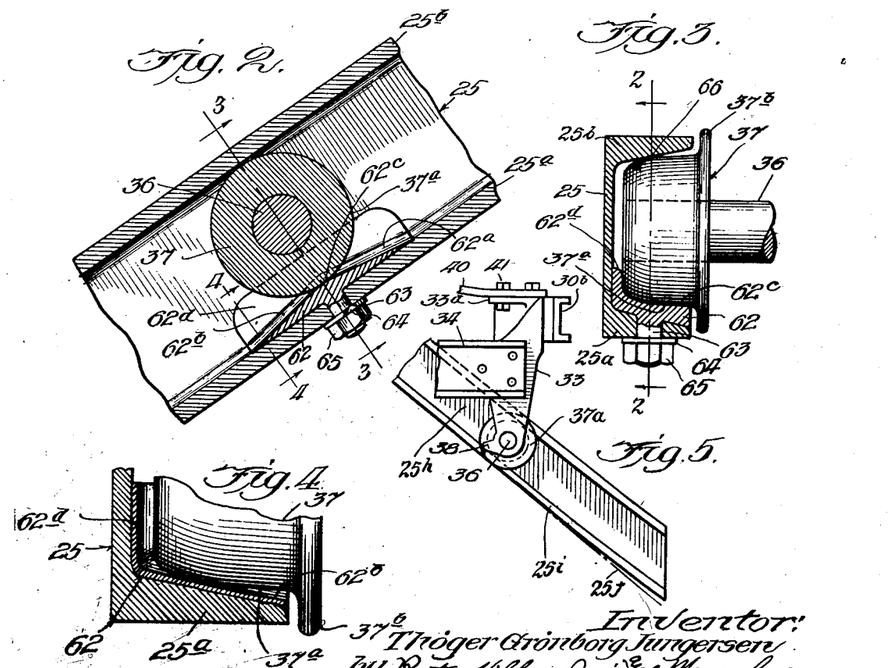
Fig. 2 is a detail sectional view taken longitudinally of one of the roller guides or supporting channels on the line 2—2 of Fig. 3 showing the means for supporting the rollers in their normal positions.
Fig. 3 is a detail sectional view taken on the line 3—3 of Fig. 2.
Fig. 4 is a sectional view on the line 4—4 of Fig. 2, assuming the roller to be in that section line.
Fig. 5 is a partial rear elevation of the track and roller bracket showing a modified construction of the lower end of the track.

The body 15 normally occupies the horizontal position shown in Fig. 6 and is adapted to be moved laterally toward either dumping position, after releasing the appropriate latching members 40, by giving the body an initial manual thrust which is imparted by the driver standing at the side of the body opposite that at which it is to be dumped. The arrangement of the rollers and guide channels 25 is such that when the body moves laterally from the normal position shown in Fig. 6, the center of gravity of the body and its load moves substantially in a horizontal plane notwithstanding the fact that the floor 15 of the body is gradually tilted in a lateral direction and moved laterally of the body and this novel arrangement facilitates the dumping of the body by an initial manual thrust without great exertion on the part of the operator. There may preferably be a slight downward movement of the center of gravity of the body and load in order to facilitate the dumping movement after the initial thrust has been imparted to the body but the downward movement of the center of gravity of the body and load in moving from the normal position shown in Fig. 6 to the dumping position shown in Fig. 8 should preferably be relatively slight in order that the work of restoring the body from dumping position to normal position may not be excessive, and the arrangemtnt should preferably be such that after the load is dumped the center of gravity of the unloaded body in its tilted position is higher than it is in its normal horizontal position. To facilitate the operation of imparting an initial dumping movement to the body, after the latch members 40 at one side of the body have been released, the track members 25ª which constitute the lower flanges of the guide channels 25 are preferably provided with cam plates 62, as shown particularly in Figs. 2 and 3. Each cam plate has a stud 63 formed integrally therewith and extending downwardly through a hole in the track member 25, its projecting end being engaged by a shoulder 64 and a nut 65 so that it is held securely in position. Each cam plate 62 has surfaces 62ª and 62ᵇ which are inclined in opposite directions longitudinally of the guide channel from an intermediate elevated portion 62ᶜ which normally contacts with the peripheral surface 37ª of the roller, as shown in Figs. 2 and 3. The rollers 37 have annular flanges 37ᵇ which are located outwardly from the edges of the flanges 25ª and 25ᵇ of the guide channels and the surfaces 37ª which contact with the cam plates 62 and with the flanges 25ª of the guide channels are curved transversely of the guide channels, as shown in Fig. 3, so that when the roller 37 is in contact with the intermediate part 62ᶜ of one of the cam plates, it contacts with the surface of the cam plate substantially throughout its width and the inner end of the roller bears against a flange 62ᵈ which projects upwardly at the inner end of the cam plate, while at the same time the upper part of the roller has a point contact as shown at 66 with the inner lower surface of the upper flange 25ᵇ of the guide channel. This arrangement of the contact surfaces is adapted to lend stability to the mounting of the body when it is in its normal position and prevents oscillation of the rollers 37 in the guide channels, which would be likely to ocur when travelling over rough roads. As soon as the body is pushed laterally, after releasing the proper latch members 40, the cam plates 62 are also of advantage in that the rollers 37 which move upwardly in the guide channels at one side of the body travel on the surfaces 62ª which have a lesser inclination to the horizontal than do the upper surfaces of the flanges 25ª of the guide channels, while at the other side of the body, where the rollers 37 move downwardly, the rollers in their initial movement contact with the inclined surfaces 62ᶜ which have a greater inclination to the horizontal than do the upper surfaces of the flanges 25ª. Thus, the surfaces of the cam plates which are engaged by the rollers 37 at the commencement of the lateral movement of the body 15 tend to accelerate that movement and tend to decrease the force which must be applied to the body in order to impart the initial dumping movement thereto.

The lateral movement of the body at the commencement of its dumping movement is accelerated not only by the inclination of the surfaces of the cam plates 62 but also by the action of the latch members 40 which have been elevated by the rods 45 and levers 43. As soon as the levers 43 are actuated at one side of the body to elevate the adjacent latch members 40, which operation is followed by hooking the lugs 48 on the side frame members 30, the spring latch members 40, pressing downwardly on the parts 43ª of the levers 43, at that side of the body, as shown in Fig. 7, results in a pressure being exerted on the body which tends to move it toward dumping position independently of any manual thrust imparted to the body by the operator. In this way the body can be put in motion with a minimum of effort and as it moves from its normal position, the rollers 37, which carry the weight of the body and its load, have a gradually decreasing area of contact with the cam plates 62, as shown in Fig. 4, and these rollers then contact with the lower track members 25ª of the guide channels 25. These track members 25ª have their upper surfaces of such form that the rollers form a point contact therewith, similar to the point contact shown at 66 in Fig. 3, and this point contact continues while the rollers are in contact directly with the guide channels. As the dumping movement of the body continues, the latch members 40, which have previously been elevated, ride up over the upper ends of the guide channels until a position is reached where the hooks 48 fall of the side frame member at that side of the body and drop downwardly into contact with the side frame members 20 of the truck frame, as shown in Fig. 8. As the body reaches its extreme dumping position, the levers 60 at the lower side of the body engage the side truck frame members 20 and automatically unlatch the bars 54 so that the door 19 at the lower side of the body is permitted to open by gravity and allow the contents of the body to dump. In order that the center of gravity of the body may be elevated slightly as the body reaches its final dumping position and to facilitate the initial return movement of the body toward its normal position, the track members 25 are preferably provided at their lower ends with cam plates 66 which are generally similar to those previously described except that their cam surfaces 66ª are inclined only in one direction. They are secured to the lower track members 25ª and are provided with inner upwardly extending flanges 65ᵇ which are adapted to engage the ends of the rollers 37 when the rollers are in their lower positions. When the body begins its return movement the surfaces 65ª, being inclined to the horizontal at a lesser angle than the surfaces of the track members 25ª, serve to reduce the resistance which must be overcome in moving the body. In Fig. 5 of the drawings there is illustrated a modified construction according to which the guide channel 25ʰ has a lower flange or track member 25ⁱ which is engaged by the roller 37ᵃ. The lower portion of the guide channel 25ʰ is inclined upwardly as shown by its displacement from the dotted line 25ʲ. This arrangement tends to elevate the lower side of the body when it reaches its lower dumping position.

Figure 11:
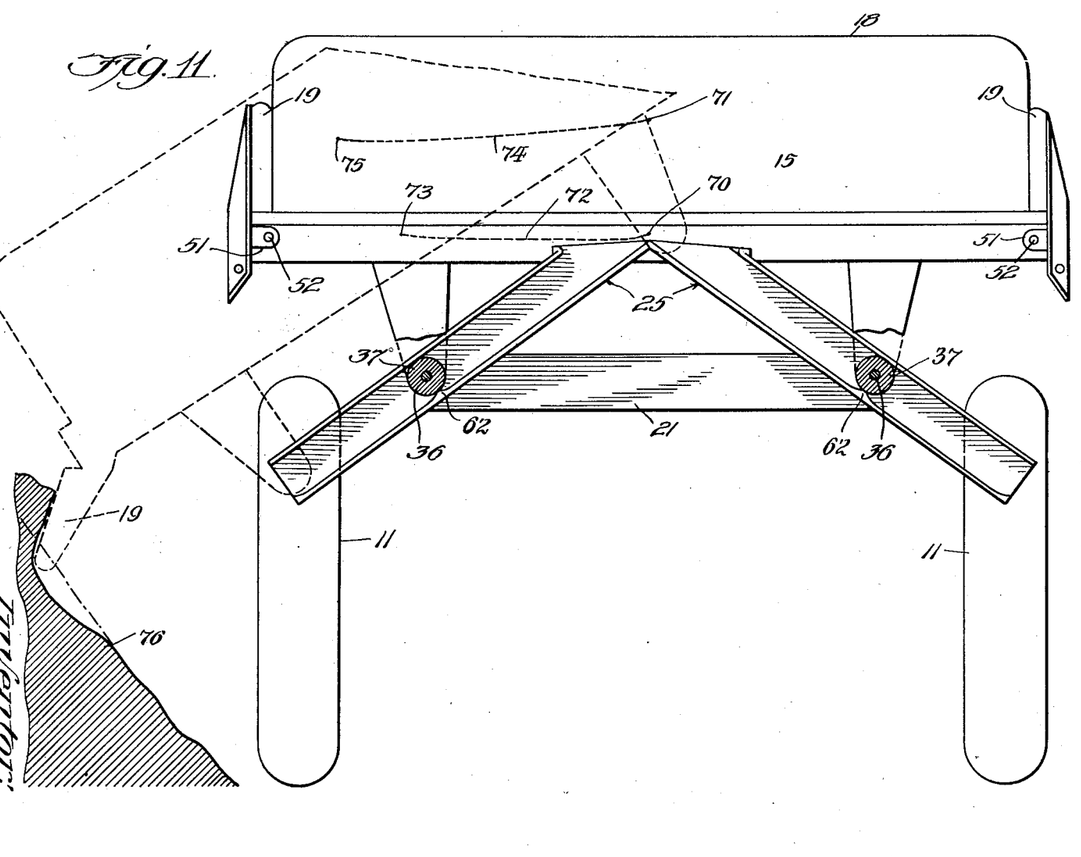
Fig. 11 is a somewhat diagrammatic rear elevation of the truck illustrating the relative arrangements of the parts and the movement of the center of gravity of the loaded body when moving to dumping position and of the center of gravity of the unloaded body when returning from dumping position to its normal horizontal position.

The effect of the inclined track members 25ᵃ and the inclined cam surfaces thereon, as well as the movements of the center of gravity of the body, will be more readily apparent from an examination of Fig. 11 of the drawings, which shows somewhat diagrammatically the relative arrangement of the parts when the body is in both its normal and its dumping positions. When the body 15 is in its normal horizontal position, as illustrated by full lines, the rollers 37 rest on the cam plates 62 and the center of gravity of the body is at the point 70 while the center of gravity of the combined body and load is at the point 71. As the body 15 moves downwardly toward the left as viewed in Fig. 11, the center of gravity of the body follows the dotted line 72 until, when the dumping position, shown by the dotted lines, is reached, the center of gravity of the body is at the point 73. During this movement, the center of gravity of the body and load moves along the dotted line 74 until it reaches the point 75 when the body is in its final dumping position. Assuming the body to be loaded when it starts from its horizontal position, the downward movement of its center of gravity along the dotted line 74 tends to facilitate its dumping movement and decreases the necessary force which must be exerted by the workman in moving the body to its dumping position. When it reaches its dumping position the load is discharged on the pile 76 thereby decreasing the weight carried by the body and causing its center of gravity to assume the position 73 which may be substantially on the same level as the position 70 which is occupied by the center of gravity when the body is in its normal position unloaded, and higher than the intermediate position of the center of gravity when traveling along the dotted line 72. The body therefore tends to return to its normal position and may readily be moved in that direction due to the fact that it is not necessary to elevate its weight. As it is returned from its lower dumping position, the inclination of the door 19, shown in dotted lines, is such that it tends to slide upwardly out of the pile 76 of loose materials which have been dumped so that no substantial portion of the dumped materials are elevated by the door during the initial return movement of the body. In the design of a truck body having the features of the present invention, the desired movements of the center of gravity of the body and of the center of gravity of the body and load may be plotted on a sheet after determining the shape of the body and the positions of the supporting rollers and then, by assuming a movement of the body which will maintain the desired movement of the centers of gravity, the proper paths of travel of the supporting rollers may be determined and the guide members or tracks may be designed accordingly to give the corresponding movement to the body.

Figure 1:
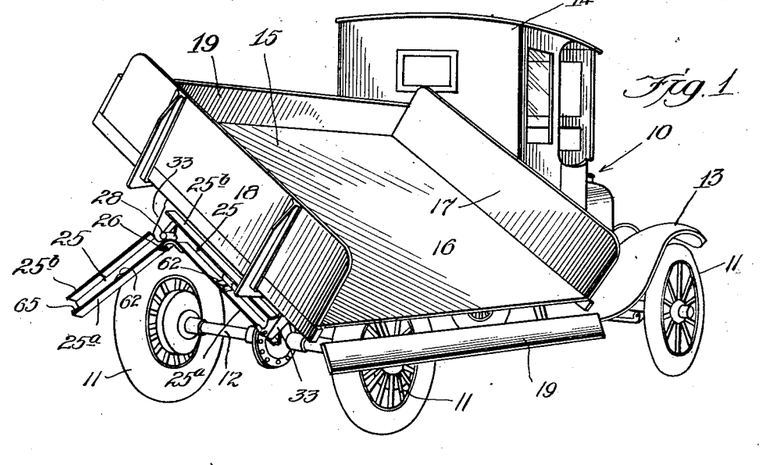
Fig. 1 is a perspective view of an automobile truck embodying the improved dumping body of the present invention, the body being shown in dumping position.

The provision of an X-shaped underframe on the body is a feature of importance since it permits lateral dumping in either direction without interference with the rear wheels of the truck. A truck body usually and preferably extends beyond the rear wheels and if the truck body be provided with longitudinal side frame members these would strike the rear wheels and interfere with the dumping movement particularly if the wheels are of large size. In the present invention, the body and its X-shaped underframe are so located with respect to the rear wheels 11 of the truck that when the body is dumped, as shown in Fig. 1, the recess formed by the inward convergence of the arms 30ᵇ of the side frame member receives the upper portion of the wheel which is located opposite the central frame portions 30ᵃ.

Figure 12:
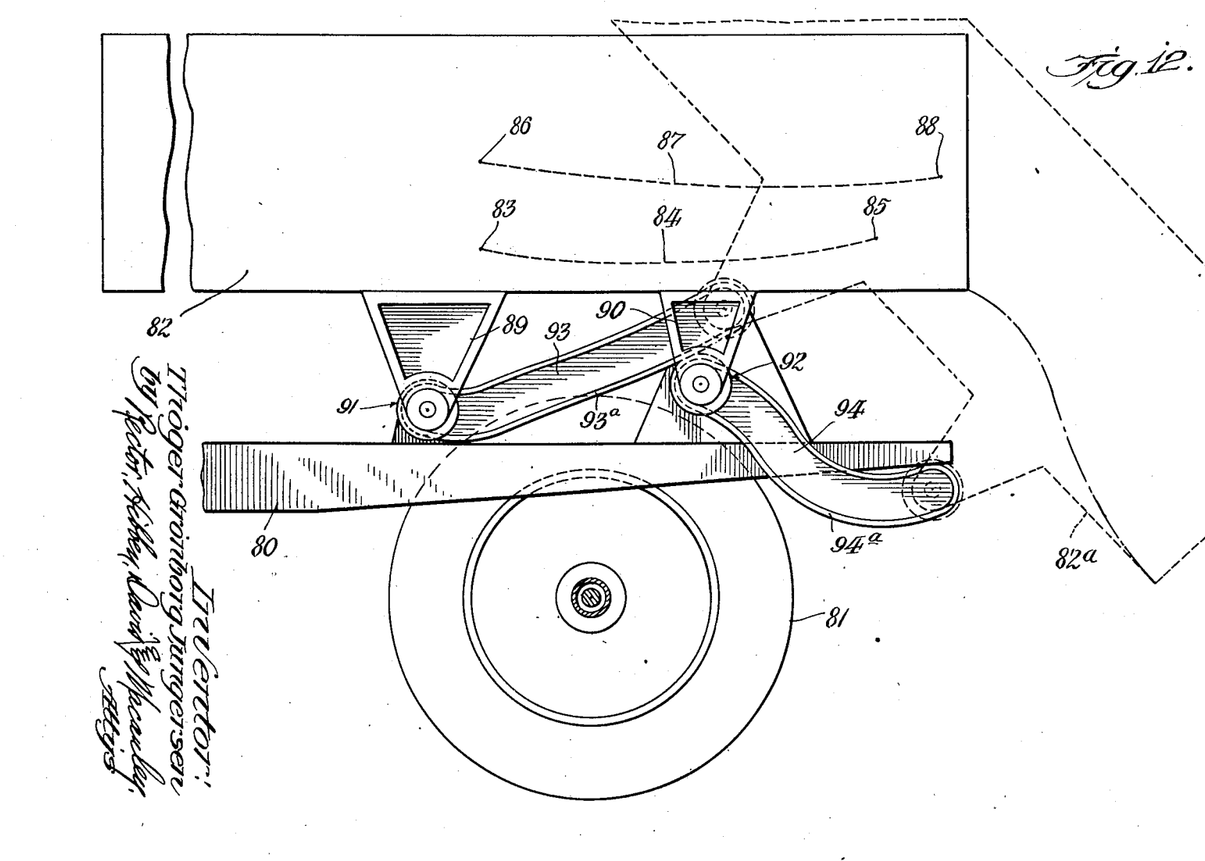
Fig. 12 is a somewhat diagrammatic side elevation of an automobile truck embodying a rearwardly dumping body illustrating the adaptation of the principles of the present invention in connection with the movement of the centers of gravity of the body and its load.

In Fig. 12 of the drawings there is illustrated a modification embodying a somewhat diagrammatic representation of the application of the present invention to a rearwardly dumping body. In this construction the truck frame comprising longitudinal side frame members 80 is supported on the rear wheels 81 and the body 82 is adapted to move from the normal horizontal position shown by full lines to the inclined dumping position shown by dotted lines at 82ᵃ. By computation, it may be determined in advance that it is desired to have the center of gravity of the body 82, when unloaded, move from the normal position 83 along the line 84 to a dumping position 85 which is higher than the normal position 83, at the same time the center of gravity of the loaded body which is normally located at the position 86 will move along the line 87 to a final position 88 which is lower than the normal position 86. The body 82 is provided at each side with downwardly extending brackets 89 and 90 which carry the rollers 91 and 92, respectively, and, proceeding in the manner previously described, it may be determined that the roller 91 should travel along a track member 93 while the roller 92 should travel along a track member 94, both having the shapes illustrated, in order to cause the centers of gravity to travel along the lines 84 and 87. The track members 93 and 94 have flanges 93ᵃ and 94ᵃ, respectively, on which the rollers travel and these track members are preferably closed at their ends in order to stop the movement of the rollers when the body reaches its final dumping position 82ª. This construction is of advantage not only in obtaining the desired movements of the center of gravity of the body which automatically facilitate the movement of the body from either position toward the other extreme position but also permit the use of a truck frame and body of relatively great length and allow the body to be dumped immediately over the rear end of the truck frame. The track members 93 and 94 are carried by the truck frame but the connections and other details are not illustrated.

Although one form of the invention has been shown and described by way of illustration, it will be understood that it may be constructed in various different embodiments within the scope of the appended claims.

I claim:

1. A dump car comprising a truck frame having wheels, a body movable laterally in either direction on said truck frame to a tilted dumping position, and a body underframe comprising a pair of side frame members deflected inwardly opposite said wheels to prevent interference with said wheels when said body is tilted and having their inwardly deflected parts connected together.

2. A dump car comprising a truck frame, a body, upwardly converging guide members carried by said truck frame, rollers carried by said body to travel on each of said guide members, a stop member mounted at the point of convergence of said guide members, and a hook carried by said body to engage said stop member when said body is tilted with respect to said truck frame.

3. A dump car comprising a truck frame, guide members mounted on said truck frame, a body having an underframe, brackets carried by said underframe and extending downwardly therefrom, rollers journaled on said brackets to travel on said guide members, hooks carried by said brackets, and a pin adapted to be engaged by one of said hooks upon movement of said body to dumping position.

4. A dump car comprising a truck frame, upwardly converging guide members carried by said truck frame, a body, brackets carried by said body and extending downwardly therefrom, rollers mounted on said brackets to travel on said guide members, a member connecting said converging guide members and having a hanger pin projecting therefrom, and a hook carried by each of said brackets and adapted to engage said hanger pin upon movement of said rollers on said guide members to effect the dumping movement of said body.

5. A dump car comprising a truck frame, a pair of guide members converging upwardly from opposite sides of said frame, a body having a roller to travel on each of said guide members in effecting the tilting of said body from its normal horizontal position to an inclined dumping position, and an auxiliary plate mounted on each of said guide members for engaging one of said rollers when said body is in its horizontal position, each of said plates having surfaces inclined away from an intermediate point which normally contacts with one of said rollers, the surface of said plate on one side of said intermediate point having greater inclination to the horizontal than the surface of said guide member and the surface of said plate on the other side of said intermediate point having a lesser inclination to the horizontal than the surface of said guide member to which said plate is attached.

6. A dump car comprising a truck frame, a track member mounted on said truck frame, and a body movable from a horizontal position to an inclined dumping position, said body having a roller movable on said track member during said movement, said roller and said track having parts forming a line contact with each other when said body is in its normal horizontal position and having a point contact with each other during movement of said body to and from dumping position.

7. A dump car comprising a truck frame, a track member mounted on said truck frame, and a body movable from a horizontal position to an inclined dumping position, said body having a roller movable on said track member during said movement, and an auxiliary member mounted on said track member for contact with said roller when said body is in its normal horizontal position, said auxiliary member and said roller having coacting surfaces forming a line contact with each other and said track member and said roller having coacting surfaces forming a point contact with each other during the movement of said body to and from dumping position.

8. A dump car comprising a truck frame, a guide member of channel form mounted on said truck frame with its web directed vertically, a body movable from a normal horizontal position to an inclined dumping position, a roller carried by said body and arranged to travel between the flanges of said guide member during said movement, said roller and the flanges of said guide member being constructed to have a point contact with each other, and an auxiliary plate mounted on the lower flange of said guide member and engaging said roller when said body is in its normal horizontal position to force said roller against said upper flange.

9. A dump car comprising a truck frame, a guide member of channel form mounted on said truck frame with its web directed vertically, a body movable from a normal horizontal position to an inclined dumping position, a roller carried by said body and arranged to travel between the flanges of said guide member during said movement, said roller and the flanges of said guide member being constructed to have a point contact with each other, and an auxiliary plate mounted on the lower flange of said guide member and engaging said roller when said body is in its normal horizontal position, said plate having an inclined roller engaging surface to accelerate the dumping movement of said body and to retard the final movement of said body toward its horizontal position, said plate and said roller having coacting surfaces forming a line contact with each other.

10. A dump car comprising a truck frame, a guide member of channel form mounted on said truck frame with its web directed vertically, a body movable from a normal horizontal position to an inclined dumping position, a roller carried by said body and arranged to travel between the flanges of said guide member during said movement, said roller and the flanges of said guide member being constructed to have a point contact with each other, and an auxiliary plate mounted on the lower flange of said guide member and engaging said roller when said body is in its normal horizontal position to force said roller against said upper flange, said plate and said roller having coacting surfaces forming a line contact with each other and said roller having a point contact with the upper flange of said guide member when said body is in its normal horizontal position.

11. A dump car comprising a truck frame, a body movable bodily on said truck frame from a normal horizontal position to an inclined dumping position, a leaf spring having one end secured to said body and the other end projecting therefrom, and a lug carried by said truck frame and lying in the path of movement of the other end of said leaf spring, whereby said spring normally holds said body in said horizontal position.

12. A dump car comprising a truck frame, a body movable bodily with respect to said truck frame from a normal horizontal position to an inclined dumping position, a leaf spring having one end secured to said body and the other end projecting therefrom, a lug carried by said truck frame and lying in the path of movement of the other end of said leaf spring to hold said body in said horizontal position, and means for bending said leaf spring to permit movement thereof with said body past said lug.

13. A dump car comprising a truck frame, a body movable laterally on said frame from a normal horizontal position to an inclined dumping position at either side of said body, a pair of latch members located on opposite sides of the center line of said truck frame for normally preventing said movement of said body, and means operable from either side of said body for releasing the latch member on that side of said body and for preventing the simultaneous release of the latch member at the other side of said body by the operation of said releasing means.

14. A dump car comprising a truck frame, a body movable bodily with respect to said truck frame from a normal horizontal position to an inclined dumping position on either side of said truck frame, a pair of leaf springs attached to opposite sides of said body and having inwardly directed parts, a pair of lugs carried by said truck frame and normally engaging the inwardly directed parts of said leaf springs for preventing movement of said body from its normal horizontal position, and an actuating device for independently releasing either of said leaf springs from engagement with its lug.

15. A dump car comprising a truck frame, a body movable bodily and laterally on said truck frame from a normal horizontal position to an inclined dumping position on either side of said truck frame, a pair of leaf springs attached to opposite sides of said body and having inwardly directed parts, a pair of lugs carried by said truck frame and normally engaging the inwardly directed parts of said leaf springs for preventing movement of said body from its normal horizontal position, a lever mounted on said truck frame adjacent each of said springs, and an operating member controlled from one side of said body for actuating each of said levers to release one of said leaf springs from engagement with its lug.

16. A dump car comprising a truck frame, a body movable bodily with respect to said truck frame from a normal horizontal position to an inclined dumping position on either side of said truck frame, a pair of leaf springs attached to opposite sides of said body and having inwardly directed parts, a pair of lugs carried by said truck frame and normally engaging the inwardly directed parts of said leaf springs for preventing movement of said body from its normal horizontal position, a lever mounted on said truck frame adjacent each of said springs, separate means for actuating each of said levers to release one of said springs from engagement with its lug, and means connecting said levers for preventing simultaneous release of both of said springs.

17. A dump car comprising a truck frame, a body movable bodily with respect to said truck frame from a normal horizontal position to an inclined dumping position on either side of said truck frame, a pair of leaf springs attached to opposite sides of said body and having inwardly directed parts, a pair of lugs carried by said truck frame and normally engaging the inwardly directed parts of said leaf springs for preventing movement of said body from its normal horizontal position, a lever mounted on said truck frame adjacent each of said springs, means connecting said levers, an operating rod attached to each of said levers and extending laterally to one side of said truck frame, a hook carried by each of said operating rods, and a member carried by said body for engagement by said hook when said rod has been actuated to release one of said leaf springs from engagement with its lug.

18. A dump car comprising a truck frame having supporting wheels, a body movable laterally of said truck frame to tilted dumping positions, and a body under frame structure comprising longitudinal frame members all of which are deflected inwardly from the sides of the body to provide spaces adapted to receive said wheels when said body is tilted laterally on said truck frame.

19. A dump car comprising a truck frame having supporting wheels, a body movable laterally of said truck frame to tilted dumping positions, and an X-shaped under frame attached to said body and having the narrow portion thereof located opposite said wheels to provide openings adapted to receive said wheels upon the tilting of said body in either lateral direction.

20. A dump car comprising a truck frame, a channel-shaped guide member mounted in an inclined position on said truck frame and having upper and lower flanges, a body, a roller carried by said body to travel on the lower flange of said guide member, and means mounted on the lower flange of said guide member for engaging said roller in the normal horizontal position of said body to accelerate the initial movement of said roller from said position.

21. A dump car comprising a truck frame, a pair of oppositely inclined channel-shaped guide members carried by said truck frame and having upper and lower flanges extending in straight lines, a body having rollers mounted to travel on said lower flanges of said guide members in moving said body to and from an inclined dumping position, and means carried by said lower flanges for holding said rollers in engagement with said upper flanges when said body is in its normal position and for accelerating the initial movement of said body from said normal position toward an inclined dumping position.

In testimony whereof, I have subscribed my name.

THÓGER GRÓNBORG JUNGERSEN.